United States Patent [19]

Hanselmann et al.

[11] Patent Number: 5,537,023
[45] Date of Patent: Jul. 16, 1996

[54] CHARGING METHOD FOR STORAGE BATTERIES

[75] Inventors: Dieter Hanselmann, Öhringen; Bernd Mayer, Walldorf; Karl-Diether Nutz, Oedheim; Stepfan-Peter Weller, Bad Friedrichshall, all of Germany

[73] Assignee: Temic Telefunken microelectronic GmbH, Heilbronn, Germany

[21] Appl. No.: 339,719

[22] Filed: Nov. 14, 1994

[30] Foreign Application Priority Data

Nov. 18, 1993 [DE] Germany ............... 43 39 363.2

[51] Int. Cl.$^6$ ............................................. H01M 10/44
[52] U.S. Cl. ....................................... 320/22; 320/49
[58] Field of Search ............................. 320/22, 21, 42, 320/32, 49

[56] References Cited

U.S. PATENT DOCUMENTS

| | | |
|---|---|---|
| 3,794,905 | 10/1974 | Long. |
| 3,912,108 | 10/1975 | Clayton et al. |
| 4,163,933 | 8/1979 | Foster. |
| 4,392,101 | 7/1983 | Saar et al. |
| 4,394,612 | 7/1983 | Emerle et al. ............. 320/31 |
| 4,503,378 | 3/1985 | Jones et al. |
| 4,746,852 | 5/1988 | Martin. |
| 5,352,967 | 10/1994 | Nutz et al. ............. 320/20 |

FOREIGN PATENT DOCUMENTS

| | | |
|---|---|---|
| 0444617 | 9/1991 | European Pat. Off. . |
| 0484803A2 | 5/1992 | European Pat. Off. . |
| 2591822 | 6/1987 | France. |
| 3014274 | 10/1981 | Germany. |
| 3811371 | 10/1989 | Germany. |
| 4033093 | 4/1992 | Germany. |
| 4125825 | 2/1993 | Germany. |

Primary Examiner—Peter S. Wong
Assistant Examiner—Gregory J. Toatley, Jr.

[57] ABSTRACT

The invention relates to a charging method for storage batteries, in particular for NiCd and NiMH cells. According to the invention, the rise in the charging voltage during each of a number of consecutive charging cycles of a specified duration is measured in the form of a unit corresponding to a certain voltage. The number of these units is transmitted in the form of a counting pulse to two up-down counters during the period of the charging cycle, whereby one counter functions in the down mode and is set at the beginning of a charging cycle to a number corresponding to the number of units established in the preceding charging cycle. In the following charging cycle, the roles of the two counters are reversed, so that the up-counter is now set to the down mode and the other counter to the up mode, whereby the latter is set to a Certain starting counting status. At the end of each charging cycle, the final status of the down counter is compared with the specified starting status, from which a switch-off criterion is derived for the charging process. According to the invention, this process enables both positive and negative changes in the dU/dt value of the charging curve to be detected with a high voltage resolution and, at the same time, minimal cost.

8 Claims, 2 Drawing Sheets

CHARGING METHOD FOR STORAGE BATTERIES

BACKGROUND OF THE INVENTION

The invention relates to a charging method for batteries, in particular for NiCd (nickel-cadmium) and NiMH (nickel hydride) cells, in which the batteries are supplied from a charging current source.

A number of such charging methods are known to date (cf. "Intelligent charging of NiCd batteries" from Design und Elektronik 22, 1992, pages 106–107), all of which are based on the objective of providing a low-cost, optimum battery charging concept. The intention is to ensure that the battery is charged as nearly as possible to its rated capacity, while at the same time avoiding overcharging, which could shorten its service life. The charging time also constitutes a criterion for evaluating the process, in that prolonged charging periods are no longer accepted. On the one hand, rapid charging with high-strength current considerably reduces the charging time. On the other hand, however, the charging period must then be precisely adhered to, otherwise the battery may be damaged beyond use. This means that a battery charger is required with a control unit which constantly monitors the charming current and the state of charge of the battery. Thus, various processes are known which monitor the dU/dt pattern of the charging curve, from which a switch-off criterion is derived. Typically, the charging process can be terminated when the battery voltage falls, i.e. with a negative du/dt value, or even with a pronounced increase in the battery voltage, i.e. with a positive dU/dt value. Up to now, the monitoring of the voltage gradient in a charging curve of this type has only been carried out with the aid of considerable circuitry resources, which in turn are reflected in high-cost batteries.

SUMMARY OF THE INVENTION

The object of the invention is to provide a charging method of the type initially described for the detection of the dU/dt pattern of the charging curve relating to the battery to be charged, which can be achieved by means of modest circuit technology.

According to the invention, the rise in charging voltage in the battery being charged is established as a unit of measurement corresponding to a certain voltage during consecutive charging cycles of a specified period of time. The number of these measured units is transmitted in the form of counting pulses, during the period of a charging cycle, to two up-down counters, of which one counter operates in the down mode and is set to a numerical value at the beginning of a charging cycle corresponding to the sum obtained from a pre-defined starting counter status and the number of units measured in the preceding charging cycle. In the following charging cycle, the roles of the two counters are reversed, so that the up-counter is now set to the down mode and the other to the up mode, the latter being set to the specific starting counter status mentioned above. After each charging cycle, the final counter status of the down counter is compared with the pre-defined starting status by the generation of a differential, from which a switch-off criterion is derived for the charging process.

Since the down counter always starts at an initial counter status, which contains a measurement of the rise in charging voltage in the previous charging cycle, i.e. representing the dU/dt value, in which dt represents the length of the charging cycle, the differential between the two designated counter statuses represents the value of the change in the dU/dt value over two consecutive charging cycles. In mathematical terms, this differential therefore represents a measurement of the second derivation of the charging curve over the two consecutive charging cycles. In this way, a limit can be established which determines whether the charging process is continued or should be regarded as completed. This limit, which represents a positive natural number, thus lays down the change in the dU/dt value over two consecutive charging cycles at which the charging process is terminated.

According to the invention, this process is particularly suitable for those types of batteries whose charging curve exhibits two turning points and a maximum, e.g., NiCd or NiMH batteries. With the rapid charging of batteries of this type, the charging voltage rises continuously until it is fully charged at the maximum of the charging curve, when approximately 110% of the rated capacity is reached. If charging continues beyond this maximum, the electrical energy delivered is only converted into heat. With an NiCd battery, the voltage maximum is considerably more pronounced than with an NiMH battery; in particular, the negative gradient of the voltage curve at the conclusion of charging does not always reliably occur. As a result, with the process according to the invention, the transition from a shallow gradient to a pronounced gradient in the area of the second turning point of the charging curve can be reliably detected by an appropriate choice of limit.

In an advantageous development of the process according to the invention, equidistant points in time are defined for the measurement of the voltage rise during each charging cycle. At each of these time stages, a comparison is made between the charge voltage and a reference voltage, whereby the reference voltage is increased in accordance with a predetermined voltage rise by the voltage value specified as the unit of measurement, This new reference value serves as the reference value in the subsequent time stage. In this way, each increase of a unit of measurement is transmitted to the two counters as a counting pulse. It is preferable, with this development of the process according to the invention, to begin with a value for the reference voltage which corresponds to the charging voltage immediately at the start of the charging cycle.

Since, with the charging of batteries having a charging curve complying with the aforementioned pattern, it is essentially a question of detecting the rise in the charging curve to the maximum point, i.e., the area about the second turning point of the curve, it is possible with another embodiment of the process according to the invention to start the charging process with a pre-charging process, whereby a comparison of the charging voltage with a reference voltage is carried out after the beginning of the charging at equidistant time stages. If the charging voltage at a specific time stage coincides with the reference voltage, the two up-down counters are activated, i.e., the actual evaluation of the change in the dU/dt value: over two consecutive charging cycles only now begins, whereby the two counters, which function in the reversed mode in the process described above, receive counting pulses corresponding to the units of measurement representing the value of the increase in charging voltage, so as to enable the counter statuses at the end of a charging cycle to be evaluated.

The charging process is now continued with the same strength of charging current. If, by contrast, the charging voltage at this particular time stage is greater than the reference voltage, the reference voltage is increased by a specific voltage and thus forms the reference value for the comparative measurement at the following time stage. Ideally, the voltage provided for the increase in the reference voltage can be of the same value as the voltage specified for the unit of measurement. In this way, the area of the charging curve which is of importance relative to the termination of the charging process is most quickly reached.

In order to prevent an erroneous value for the charging voltages from being used for the comparative measurement processes, the charging process is interrupted at the measurement time stages. In this way, the measured charging voltage corresponds only to the electrochemical cell potential and contains no resistance components based on the conductor resistance, electrode resistance or electrolyte resistance.

In order to ensure that the battery is also effectively fully charged, the charging process is concluded with a so-called top-off charge, which takes place with a reduced charging current. This post-charging process takes place for a specified period of time and only after it is concluded is the entire charging process terminated.

BRIEF DESCRIPTION OF THE DRAWINGS

The process according to the invention is presented and explained by reference to a typical embodiment and in conjunction with a number of drawings. These are as follows.

DESCRIPTION OF THE PREFERRED EMBODIMENTS

Figure 1:
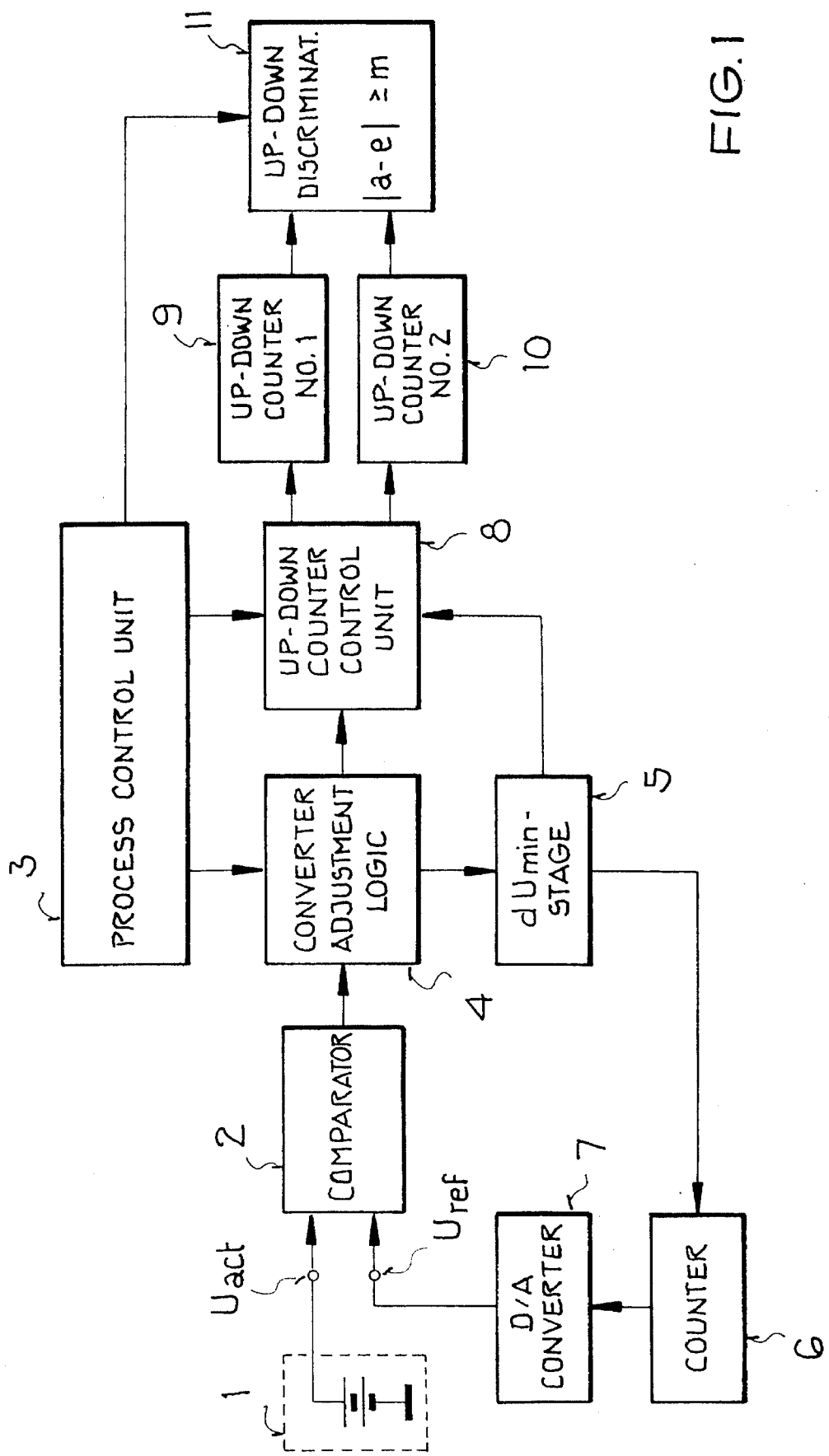
FIG. 1 A block circuit diagram representing the process according to the invention, FIG. 2 A counter status diagram explaining the function of the two counters shown in FIG. 1.

In FIG. 1, a process control unit 3 is shown which, when connected to a battery to be charged 1 initially tests marginal conditions such as the temperature or the presence of a short circuit, and only after a successful test result is the charging current released for a certain period of charging time, typically 20 s. At the end of this first charging phase, the charging current is switched off for some 100 ms. During this charging current interval, the actual value Uact for the battery voltage is compared with a reference value Uref with the aid of a comparator 2. This reference voltage Uref is generated by a D/A converter 7, which converts a digital value supplied by a counter 6 into a corresponding analog value, i.e., the reference value Uref.

If, at the first charging current interval, the actual value Uact is greater than the reference value Uref, a further charging phase of the same duration follows, but the reference value Uref is adjusted by a certain amount. For this purpose, a converter adjustment logic (4), which is connected in series to the comparator 2, triggers a circuit 5 to start the counter 6 at a certain number of steps which corresponds to a minimum voltage interval dUmin of 5 mV. In this way, after every charging phase, if the actual value Uact is greater than the reference value Uref, the reference value Uref is increased on each occasion by one voltage interval dUmin. When the actual value Uact and reference Uref coincide, the precharging phase switches to the main charging phase, in that the process control unit 3 triggers the two up-down counters 9 and 10. In this way, the charging process is continued with the same strength of charging current.

Figure 2:
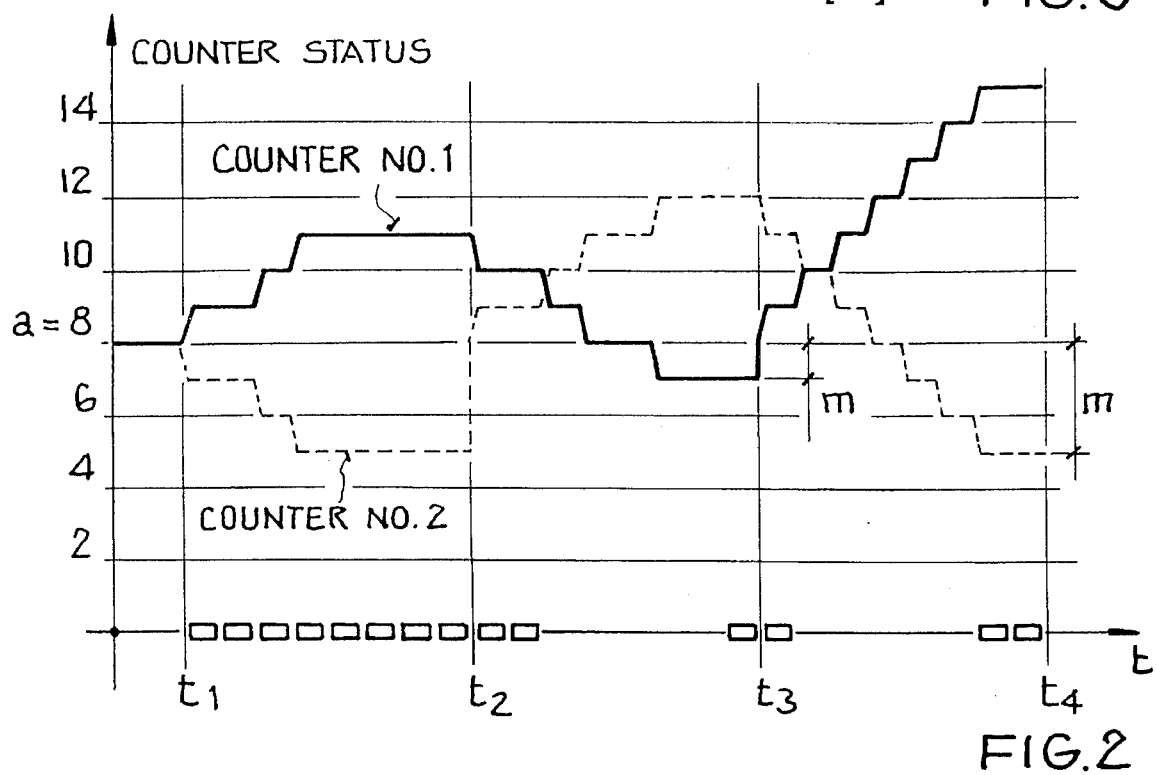

Thus, when the comparator 2 indicates to the converter adjustment logic 4 that the actual value Uact coincides with the reference value Uref, the converter adjustment logic 4 gives clearance to an up-down counter control unit 8 to start the two up-down counters 9 and 10. These two four-bit counters 9 and 10 serve to identify an increase in the gradient of the charging voltage and deliver their respective counter status to an up-down discriminator 11, which carries out an evaluation of the counter statuses. The main charging phase which now follows takes place on a cyclical basis and is interrupted after 160 s, during which charging intervals the evaluation of the counter status is carried out by one of the two counters 9 or 10. These intervals are shown in FIG. 2 as t1 to t4. Each charging cycle, lasting 160 s, is itself cyclically interrupted again, with the result that 8 charging phases, each of approximately 20 s duration, are created. In each of the seven charging intervals thus arising, the actual value Uact and the reference value Uref are compared in turn by the comparator 2.

At the beginning of the main charging phase, i.e. at the beginning of time stage t1, as per FIG. 2, both the first counter 9 and the second counter 10 are set to a predefined starting condition, in this case at numerical value 8. In this connection, the first counter 9 is initially set to the up mode and the second counter 10 to the down mode. If, in a charging interval, the actual value Uact is greater than the preset value Uref, the D/A converter 7 is adjusted. At the same time, the up-down counter control unit 8 receives an adjustment pulse from circuit 5, which is transmitted by circuit 8 to the two counters 9 and 10 as a counting pulse, whereby the first counter counts one step up and the second counter one step down. This process is repeated seven times, until the first counter typically shows counter status 11 and the second counter shows counter status 5. At time stage t2, the first counter 9 is set to the down mode and the second counter to the up mode, while simultaneously being set to its starting counting mode, i.e., numerical value 8. The charging current is now interrupted again after every 20 s, a comparison of the actual value is made with the reference value, and if necessary, the reference value Uref readjusted. After every adjustment stage, this leads to a step-wise reduction in the counter status of counter No. 1 and a step wise increase of the status of counter No. 2. At the end of the second charging cycle, i.e. at time stage t3, counter No. 1 will typically indicate counter status 7 and counter No. 2 will indicate counter status 12.

The up-down discriminator 11 now carries out its first evaluation, in that initially the differential between the final counter status e of counter No. 1 and the starting counter status a is formed. In the present case, this differential is as follows:

$$m=/a-e/=1.$$

This differential m shows the relative change in the gradient of the charging curve by comparison with the preceding 160 s charging cycle. In the present case, this signifies that the gradient during the second charging cycle has increased by the relative value 1 by comparison with the first charging cycle.

In this way, it is possible to determine a specific value for differential m, at which the rapid charging process should be terminated. A practical value for the differential has proved to be m=3. Thus the switch-off criterion becomes:

$$|a-e| \geq m.$$

During the third charging cycle between time stages t3 and t4 as per FIG. 2, this switch-off criterion is reached at time stage t4. At time stage t3, the first counter is first returned to the up mode and simultaneously set to a starting value of a=8, while the second counter is switched to the down mode. As shown in FIG. 2, readjustment stages were required during this third charging cycle 7, with the result that the final counter status of the first counter is 15, while the final counter status e of the second counter is 5. Thus the differential amounts to m=3, fulfilling the aforesaid condition, with the consequence that the rapid charging process is terminated. If, by contrast, the switch-off condition is not met, a 160 s charging cycle is repeated until a switch-off criterion is obtained.

If the gradient of the charging curve increases constantly, the differential a–e is also positive. If the charging voltage gradient reduces instead of increasing, the final counter status e is Greater than the starting counter status a, i.e. differential a–e is negative. Thus, with the aforementioned switch-off condition, the rapid charging process is also terminated here. This switch-off criterion is reached when the charging voltage has exceeded its maximum.

Figure 3:
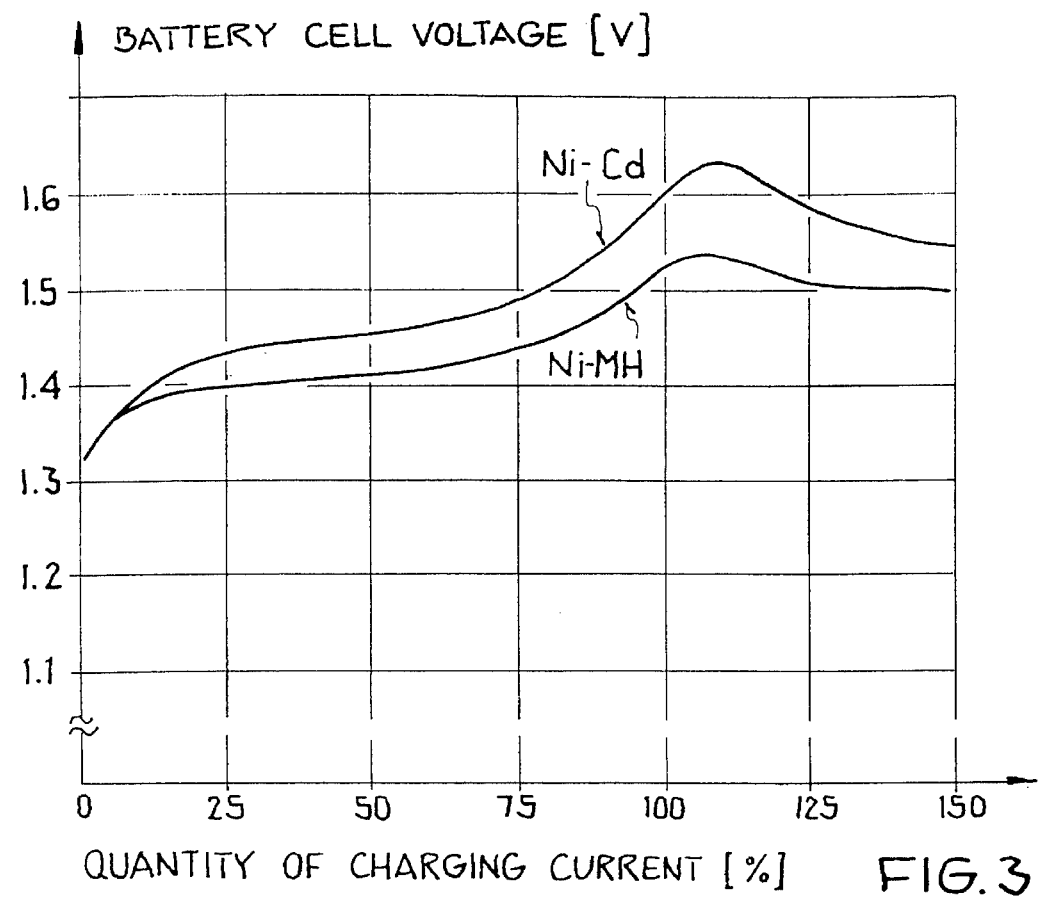
FIG. 3 The voltage curves during the charging of NiCd and NiMH batteries.

FIG. 3 shows a voltage curve during the charging of NiCd and NiMH batteries. With the charging process according to the invention, factor m which determines the switch-off criterion is adjusted in such a way that the rapid charging process is switched off before the maximum point of the curve is reached. This occurs when a pronounced increase gradient is present between charging cycles or, in mathematical terms, when the second derivative of the charging curve exhibits a high value. The second switch-off criterion, at which the maximum has already been exceeded, i.e. differential a–e is negative, does not normally come into effect, since the first criterion, i.e., when the differential a–e is positive and value m is exceeded, occurs beforehand. For this reason, this second switch-off criterion is only co-evaluated for reasons of safety.

In this way, both the switch-off criteria can also be evaluated with different factors, in contrast to the above method, i.e.

$$a-e \geq m^1 \text{ and}$$

$$e-a \geq n,$$

whereby m' and n are positive whole numbers.

In order to mask out sudden voltage changes in the battery, a shift register (a so-called 3-bit plausibility shift register) can be connected downstream of the comparator 2. Only when the same converter adjustment signal is output by the comparator three times in succession does the converter adjustment logic 4 receive a clock signal, as do also the two counters 9 and 10. If the shift register previously indicates the status "000", only 5 out of the possible number of adjustment clock signals within a 160 s charging cycle can effect a change in the two counters 9 and 10 and the D/A converter 7. In the counter diagram shown in FIG. 2, no allowance is made for a 3-bit plausibility shift register of this type, since this is only intended to explain the charging process according to the invention.

On the completion of the rapid charging process, the residual capacity of the battery is carefully charged at a reduced charging current (Top-off charging), the period of this post-charging process being capable of being limited to approx. 20 minutes. On the completion of the post-charging process, there follows a so-called holding charging process, during which the strength of the charging current is again reduced. The holding charging process is continued until the battery is removed from the battery charger.

What is claimed is:

1. Charging method for batteries, in particular for NiCd (nickel cadmium) and NiH (nickel hydride) cells, whereby the batteries are supplied from a charging current source, and wherein:

a) the current charging source is isolated cyclically from the battery for the purpose of generating charging cycles of a specific duration, b) the rise in charging voltage in consecutive charging cycles is measured in the form of a unit of measurement corresponding to a certain voltage, c) at the beginning of a charging cycle, c1) a first up-down counter (9) is set to a predefined starting counter status (a>0) and switched to the up mode, while c2) a second up-down counter (10) is set to the down mode and exhibits a counter status (e) which corresponds to the sum of the value of the predefined starting counter status (a) and the value of units of the voltage increase of the preceding charging cycle, d) the number of units of voltage increase established over a charging cycle is transmitted to the first and second counters (9, 10) as a numerical value, e) at the end of a charging cycle, the differential is established from the counter status (e) of the second counter and the predefined starting counter status (a), and e1) the charging process is terminated if the differential is greater than a certain positive value (m), otherwise e2) the charging process is continued by a single charging cycle, in that process stages c) to e) are repeated in such a way that the second counter is now set to the predefined starting counter status (a) and switched to the up mode, while the first counter is set to the down mode.

2. Process according to claim 1, wherein the following process stages are carried out for the purpose of measuring the voltage increase over a charging cycle:

a) equidistant time stages are determined over the duration of a charging cycle, b) a comparison between the charging voltage (Uact) and a reference value (Uref) is carried out at each of these time stages, whereby after a predetermined voltage increase, the reference value (Uref) is increased by the voltage corresponding to a unit of measurement, and c) each increase by one unit of measurement is transmitted as a counting pulse to the two counters (9, 10).

3. Process according to claim 2, wherein the reference value (Uref) corresponds to the actual charging voltage (Uact) at the beginning of a charging cycle.

4. Process according to claim 3, wherein a pre-charging process with the following process stages is carried out:

a) equidistant time stages are established for the measurement of the charging voltage (Uact), b) a comparison between the charging voltage (Uact) and a reference voltage (Uref) is carried out at these time stages, c) if the charging voltage (Uact) coincides with the reference value (Uref) at one of these time stages, the up-down counters (9, 10) are activated to carry out the main charging process, and d) if, at one of these time stages, the charging voltage (Uact) is greater than the reference value (Uref), the reference value is increased by a certain voltage, thus forming the reference value (Uref) for the comparative measurement at the following time stage.

5. Process according to claim 4, wherein the pre-charging and main charging processes are carried out at the same charging current strength.

6. Process according to claim 5, wherein the charging cycle is briefly interrupted at each time stage for the purpose of measuring the voltage increases.

7. Process according to claim 6, wherein the last charging cycle is followed by a post-charging process at a reduced current strength by comparison with the charging current delivered for the last charging cycle.

8. Process according to claim 7, wherein the post-charging process (top-off charging) is terminated after a specific period of time.

* * * * *

UNITED STATES PATENT AND TRADEMARK OFFICE
CERTIFICATE OF CORRECTION

PATENT NO. : 5,537,023
DATED : July 16, 1996
INVENTOR(S) : Dieter HANSELMANN, Bernd MAYER, Karl-Diether NUTZ, Stefan-Peter WELLER It is certified that error appears in the above-indentified patent and that said Letters Patent is hereby corrected as shown below:

On title page of Patent No. 5,537,023 under [75] Inventors, the fourth inventor's <u>first</u> name should read: --STEFAN-PETER--; and in Column 2 under "Assistant Examiner--Gregory J. Toatley, Jr." on the title page, please add: --Attorney, Agent, or Firm--Spencer & Frank--.

Signed and Sealed this

First Day of October, 1996

*Attest:*

BRUCE LEHMAN

*Attesting Officer*　　*Commissioner of Patents and Trademarks*